United States Patent [19]

Hieda

[11] Patent Number: 5,132,783
[45] Date of Patent: Jul. 21, 1992

[54] DEVICE FOR ADJUSTING WHITE BALANCE BY PEAK DETECTION AND SMOOTHING

[75] Inventor: Teruo Hieda, Kanagawa, Japan

[73] Assignee: Canon Kabushiki Kaisha, Tokyo, Japan

[21] Appl. No.: 510,052

[22] Filed: Apr. 17, 1990

[30] Foreign Application Priority Data

Apr. 20, 1989 [JP] Japan .................. 1-098742

[51] Int. Cl.⁵ .............................. H04N 9/73
[52] U.S. Cl. .......................... 358/29; 358/44
[58] Field of Search ............. 358/29, 29 C, 41, 44, 358/212, 213.11, 213.28

[56] References Cited

U.S. PATENT DOCUMENTS

| | | | |
|---|---|---|---|
| 4,470,067 | 9/1984 | Mino | 358/169 |
| 4,635,101 | 1/1987 | Nakayama | 358/21 R |
| 4,667,224 | 5/1987 | Fujisige | 358/29 C |
| 4,901,152 | 2/1990 | Hieda et al. | 358/29 C |
| 4,931,856 | 6/1990 | Hieda et al. | 358/44 |
| 4,942,459 | 7/1990 | Hieda et al. | 358/41 |
| 4,947,242 | 8/1990 | Hieda | 358/41 |
| 5,010,394 | 4/1991 | Murao | 358/41 |

FOREIGN PATENT DOCUMENTS 62-274888 11/1987 Japan .

Primary Examiner—James J. Groody
Assistant Examiner—Kim Yen Vu
Attorney, Agent, or Firm—Robin, Blecker, Daley & Driscoll

[57] ABSTRACT

An automatic white balance adjusting device for use in a video camera has a plurality of color sensors for sensing a plurality of color components of light coming from an object or thereabout, a plurality of logarithmic compression circuits for effecting logarithmic compression of the respective outputs of the plurality of color sensors, a subtracting circuit for obtaining a difference between outputs of the plurality of logarithmic compression circuits, a smoothing circuit for smoothing an output of the subtracting circuit, a peak detecting circuit for detecting a peak value of the output of the subtracting circuit, an adding circuit for adding, at a predetermined ratio, an output of the smoothing circuit and an output of the peak detecting circuit, and a gain control circuit for controlling gains of color signals output from an image sensor in accordance with an output of the adding circuit.

16 Claims, 5 Drawing Sheets

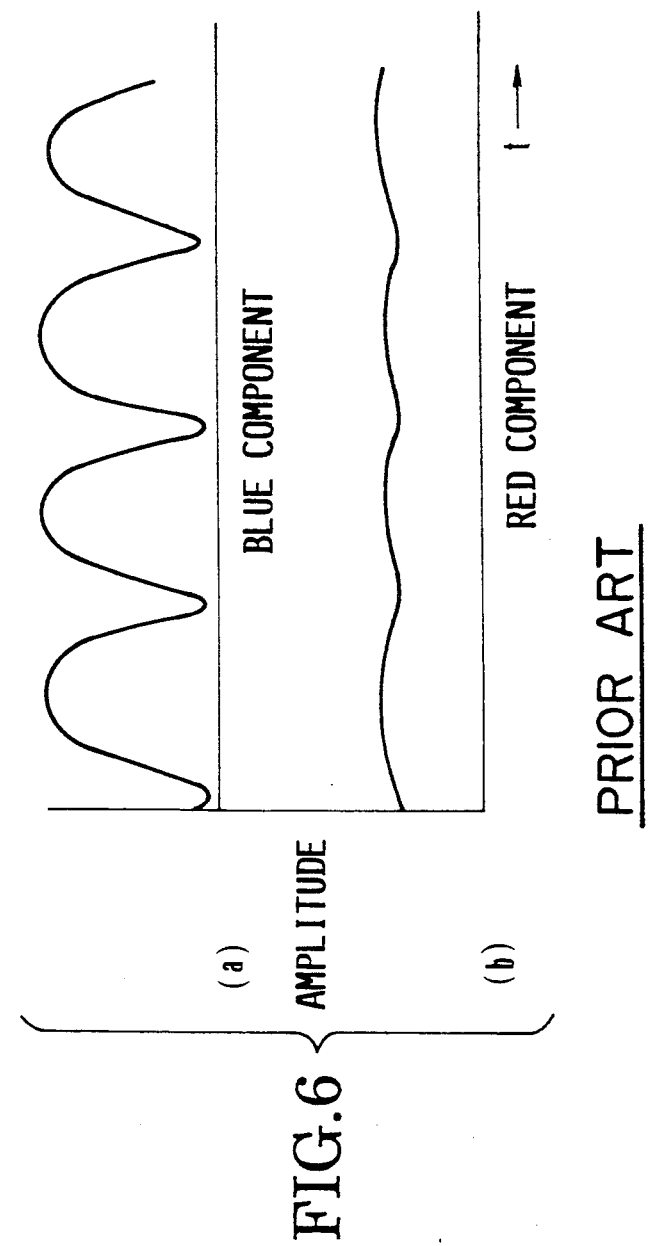

DEVICE FOR ADJUSTING WHITE BALANCE BY PEAK DETECTION AND SMOOTHING

Background of the Invention

1. Field of the Invention

The present invention relates to an automatic white balance adjusting device for a color video camera.

2. Description of the Related Art

Hitherto, a so-called external-color-measurement type white balance adjusting device has been proposed for the purpose of automatic white balance adjustment of video cameras. In this known device, the color components of light around an object are detected by an optical system which is different from an imaging optical system, and the gain of a color signal processing circuit for processing color image signals is controlled in accordance with the output of the color-component detecting optical system, so that the white balance is automatically adjusted in conformity with the illumination of the object.

FIG. 5 shows an example of a known automatic white balance adjusting device. The device has an imaging optical system 101, an image sensor 102, a signal processing circuit 103 for separating the output of the image sensor 102 into a luminance signal and a chrominance signal to form a video signal, a video output terminal 104, an R sensor 105 and a B sensor 106 arranged to receive light from the region around the object and capable of respectively sensing the red component and the blue component of the light, LOG amplifiers 107 and 108 for effecting logarithmic conversion of the outputs of the R sensor 105 and the B sensor 106, a subtraction amplifier 109 for amplifying the difference between the outputs of these two LOG amplifiers, a smoothing circuit 110, and an inversion amplifier 111.

An image of an object (not shown) in formed on the image sensor 102 through the imaging optical system 101 and is photoelectrically converted into electrical signals which are then changed into a video signal through the signal processing circuit 103 to be output from the video output terminal 104. On the other hand, red and blue components of the light coming from the region around the object, which are sensed by the R sensor 105 and the B sensor 106, are logarithmically converted by the LOG amplifiers 107 and 108, and the difference between the converted values is amplified by the subtraction amplifier 109 and then smoothed by the smoothing circuit 110. The smoothed signal is then input to a red gain control circuit in the signal processing circuit 103. The smoothed signal also is delivered, after inversion by the inversion amplifier 111, to a blue gain control circuit in the signal processing circuit 103.

When a light source having a flickering component, e.g., a fluorescent lamp, is used as the light for illuminating the object, an error which is not negligible tends to be caused at the time of forming of white balance adjusting signals, as will be realized from the following description.

In FIG. 6, parts (a) and (b) respectively represent changes of amplitudes of blue and red color components of the light from a fluorescent lamp. As will be seen from this Figure, the amount or amplitude of flicker of the blue component is greater than that of the red component. In general, the amplitude of flicker of the blue component is about 5 to 30 times as large as that of the red component. The blue and red components are logarithmically compressed by the LOG amplifiers 107 and 108 at different compression ratios, so that the ratio between the blue component and the red component in the output of the smoothing circuit 110 is deviated from that of the original light. The amount of deviation depends on the amount of flicker of the light source. Thus, the white balance is deviated from that of the object when a light source having a flickering component is used.

Summary of the Invention

The present invention is aimed at overcoming the above-described problems of the prior art.

Accordingly, an object of the present invention is to provide an automatic white balance adjusting device for use with a video camera, capable of producing an adequate white balance even when an illuminating light source having flicker components is used.

To this end, according to the present invention, there is provided an automatic white balance adjusting device comprising: a plurality of color detecting means for detecting a plurality of color components of light coming from an object or thereabout; a plurality of logarithmic compression means for effecting logarithmic compression of the respective outputs of the plurality of color detecting means; subtracting means for obtaining a difference between outputs of the plurality of logarithmic compression means; smoothing means for smoothing an output of the subtracting means; peak detecting means for detecting a peak value of the output of the subtracting means; adding means for adding, at a predetermined ratio, an output of the smoothing means and an output of the peak detecting means; and gain control means for controlling gains of color signals output from an image sensor in accordance with an output of the adding means.

According to this arrangement, the reduction in the ratio between color components in the white balance adjusting signal, which occurs when the object is illuminated with a light coming from a light source having flickering components, can be reduced to decrease deviation of the white color balance.

The above and other objects, features and advantages of the present invention will become more clear from the following description of the preferred embodiments when the same is read in conjunction with the accompanying drawings.

Brief Description of the Drawings

FIG. 6 is a chart showing changes in the blue and red components of a light coming from a fluorescent lamp.

Detailed Description of the Preferred Embodiments

Figure 1:
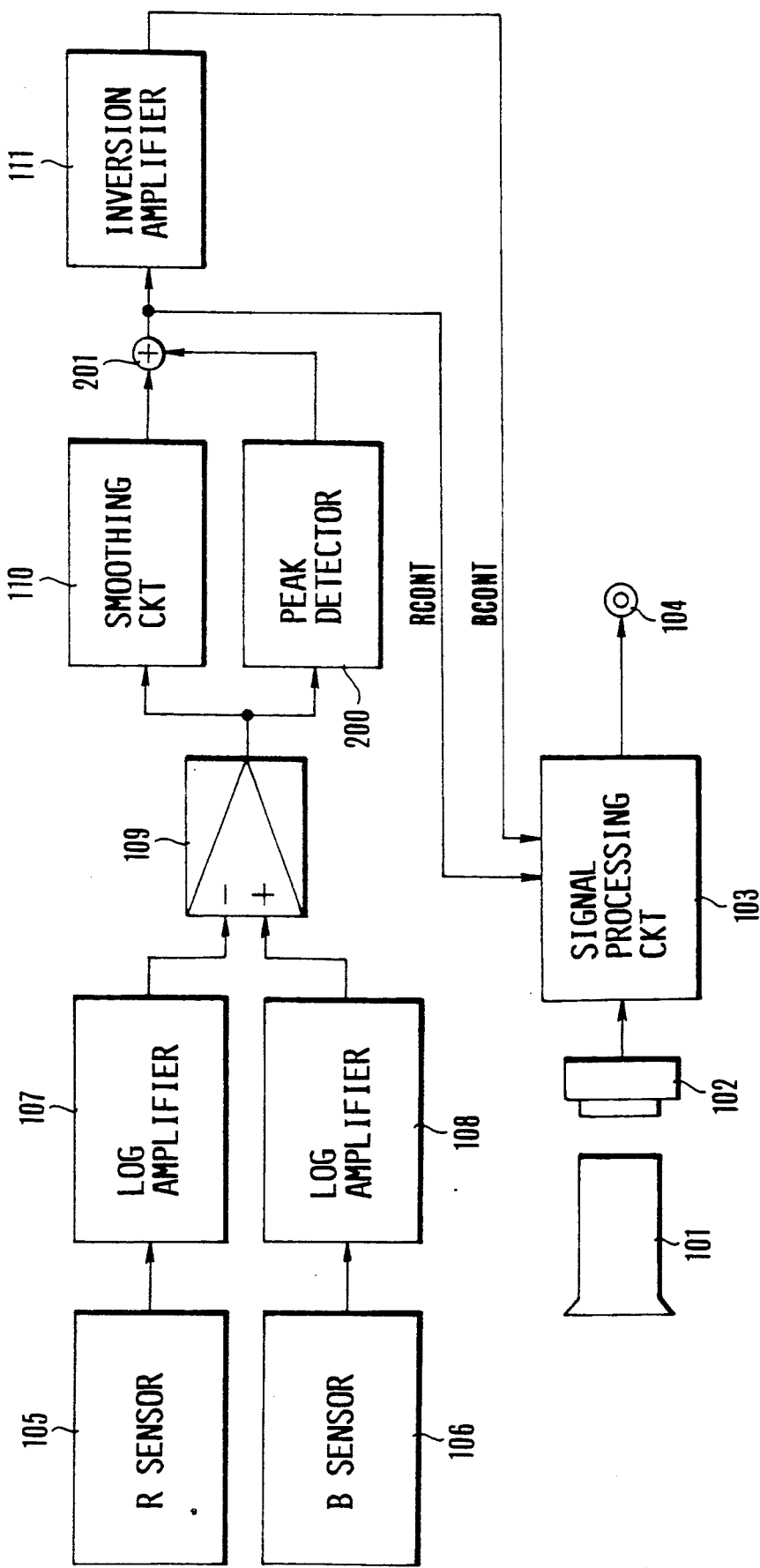
FIG. 1 is a block diagram showing the construction of a first embodiment of an automatic white balance adjusting device of the present invention.
Figure 5:
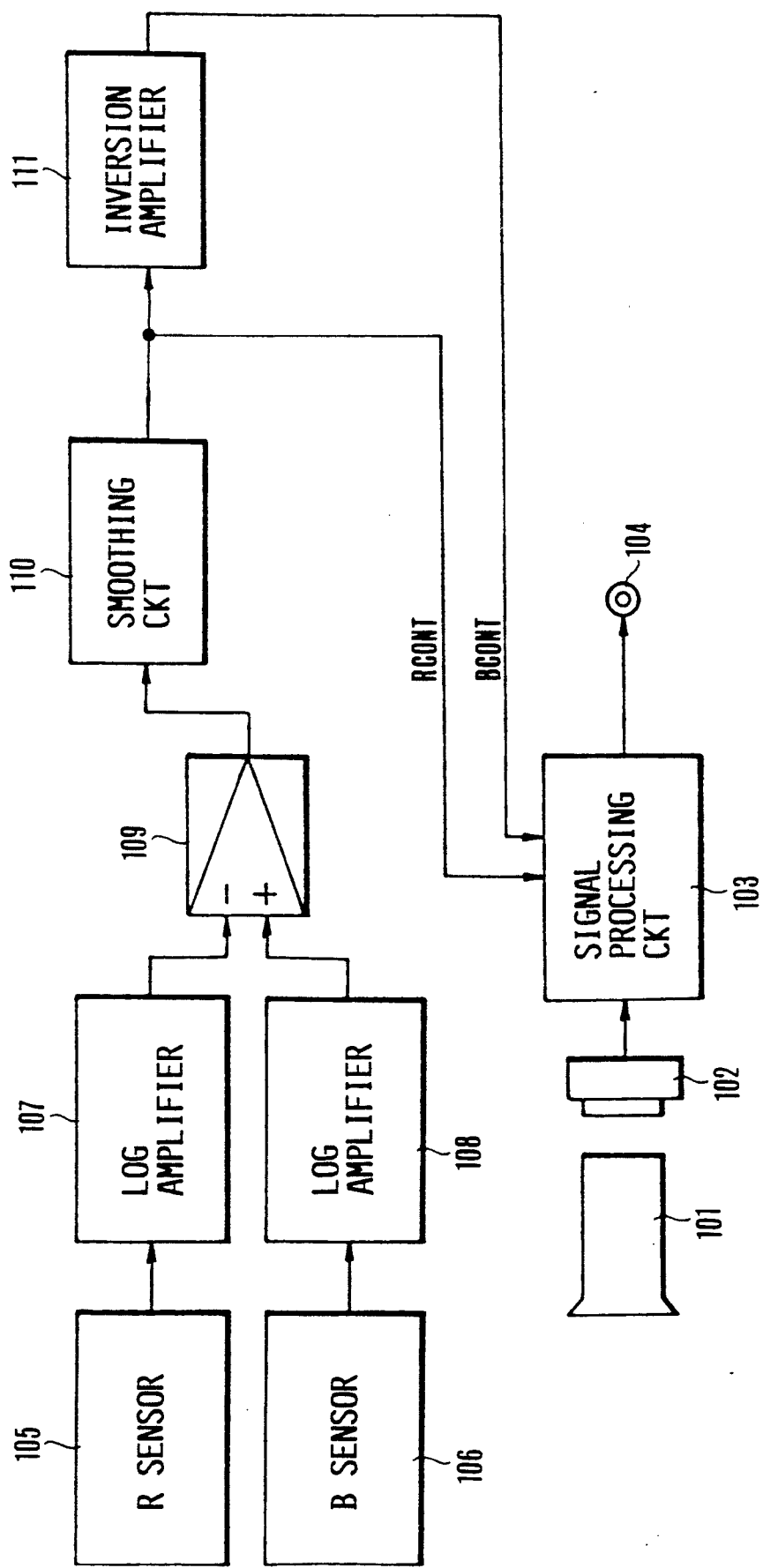
FIG. 5 is a block diagram of a known white balance adjusting device.

FIG. 1 is a block diagram of a first embodiment of an automatic white balance adjusting device of the present invention for use in a video camera. In this Figure, the same reference numerals are used to denote the components which are the same as or equivalent to those of the known device explained before in connection with FIG. 5. Numeral 200 denotes a peak detector for detecting the peak level of an input signal, while 201 denotes an adder. The output of the subtraction amplifier 109 is input to the smoothing circuit 110 as described before and also to the peak detector 200 so that the peak value of the output of the subtraction amplifier 109 is detected. The peak value is added by the adder 201 to the output of the smoothing circuit 110, and the result of the addition is input to the inversion amplifier 111. The ratio between the two signals added together by the adder 201 is suitably set in such a manner as to adequately correct the error mentioned before. Then, as in the known device described before, the output of the adder 201 and the output of the inversion amplifier 111 are input to the red gain control circuit and the blue gain control circuit, respectively, of the signal processing circuit 103, so that an automatic white balance adjustment is performed.

Figure 2:
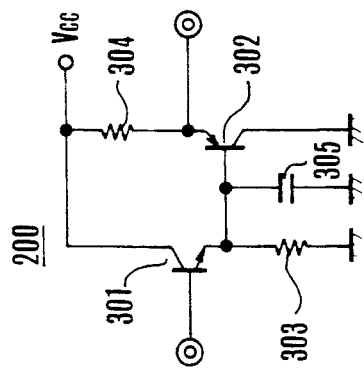
FIG. 2 is a circuit diagram of a peak detector used in the first embodiment.

FIG. 2 is a circuit diagram showing the construction of the peak detector 200 used in this embodiment. The peak detector 200 has transistors 301 and 302, resistors 303 and 304 and a capacitor 305. The input signal is supplied to the base of the transistor 301. The resistor 303 and the capacitor 305 are connected to the emitter of this transistor 301, so that the capacitor 305 is charged up to the peak level of the input signal, and the emitter of the transistor 302 delivers a signal which is substantially the same as the peak level of the input signal.

Figure 3:
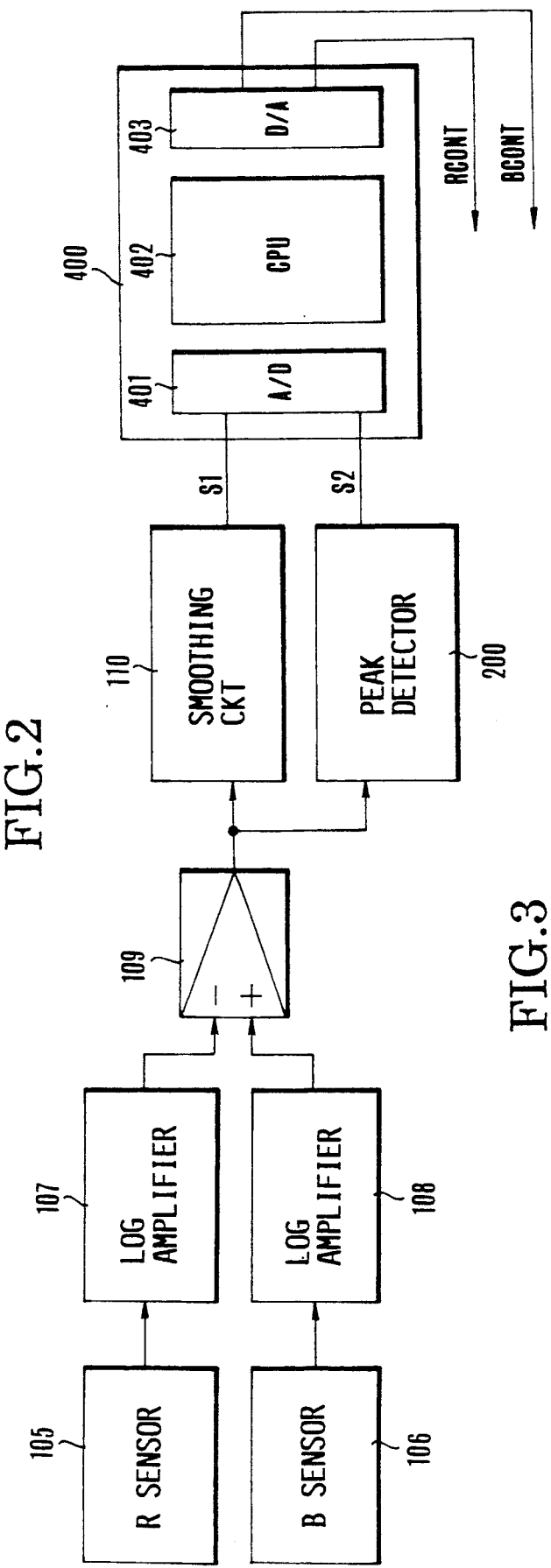
FIG. 3 is a block diagram showing the construction of a second embodiment of the present invention.

FIG. 3 is a block diagram of a second embodiment of the automatic white balance adjusting device of the invention for a video camera.

This embodiment features a microcomputer 400 including an A/D converter 401, a CPU 402 and a D/A converter 403. The output S1 of the smoothing circuit 110 and the output S2 of the peak detector 200 are respectively delivered to the A/D converter 401 of the microcomputer 400 so as to be converted into digital signals, which are then processed by the CPU 402, and the processed signals are converted again through the D/A converter 403 as a red signal control signal RCONT and a blue signal control signal BCONT. The control signals RCONT and BCONT are input to the signal processing circuit 103, so that white balance is automatically adjusted.

Figure 4:
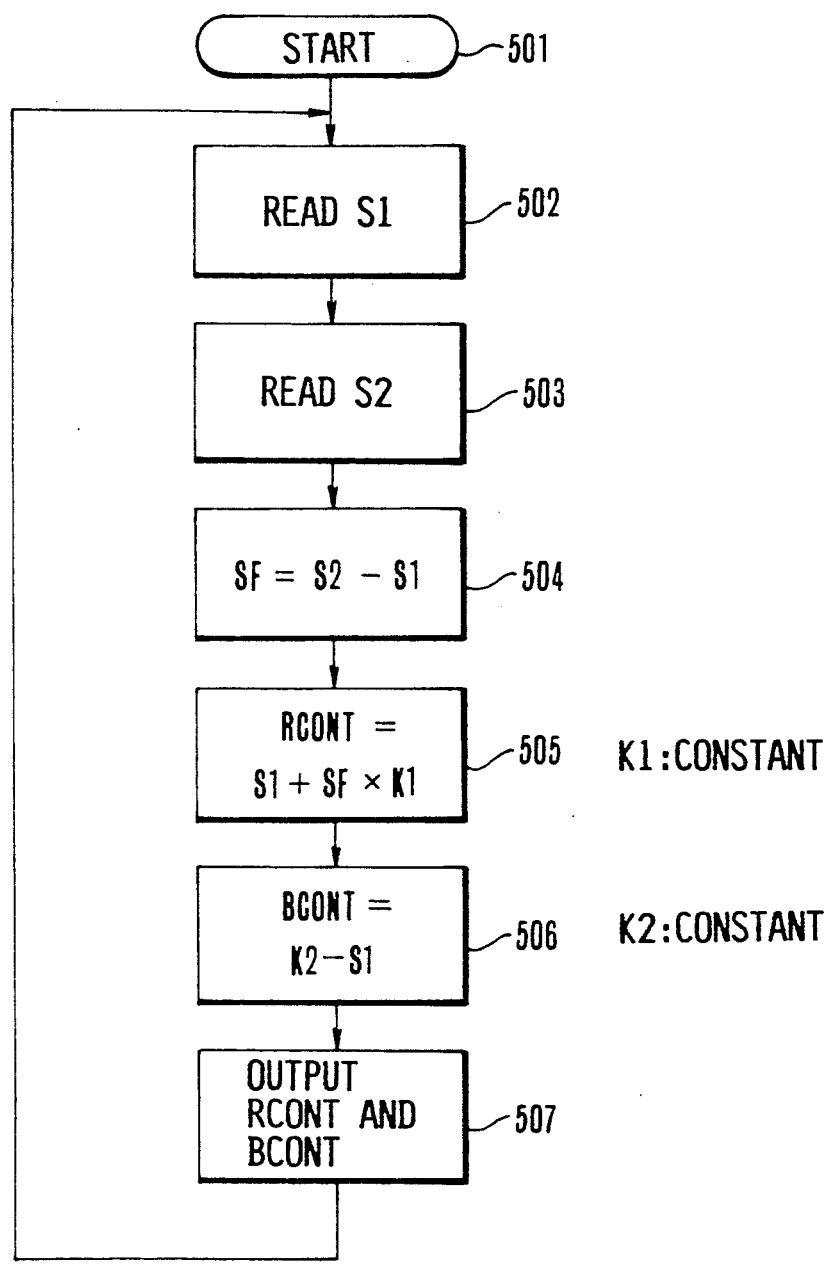
FIG. 4 is a flow chart illustrating the operation of the second embodiment.

FIG. 4 is a flow chart illustrating the operation of the microcomputer 400 shown in FIG. 3. The operation of the microcomputer 400 starts in Step 501. In Step 502, the signal S1 is read from the A/D converter 401. In Step 503, the signal S2 is read. In Step 504, the microcomputer 400 computes the flicker level SF. In Step 505, the microcomputer 400 computes the red color signal control signal RCONT. In Step 506, the microcomputer 400 computes the blue color signal control signal BCONT. In Step 507, the control signals RCONT and BCONT are output from the D/A converter 403. The process then returns to Step 502.

Although each described embodiment employs sensors for white balance besides the imaging optical system, this is not exclusive and the arrangement may be such that the image sensor also is used as the sensors for white balance.

As has been described, according to the present invention, the white balance is adjusted in accordance with a signal which is obtained by summing, at a predetermined ratio, the output of the smoothing circuit and the output of the peak detector, so that a correct white balance adjustment can be realized regardless of the type of the light source.

Although the invention has been described through specific terms, it is to be understood that the described embodiments are only illustrative and various changes and modifications may be imparted thereto without departing from the scope of the present invention which is limited solely by the appended claims.

What is claimed is:

1. An automatic white balance adjusting device comprising:
   (a) a pair of color detecting means for detecting a pair of color components of light coming from an object or thereabout;
   (b) a pair of logarithmic compression means for effecting logarithmic compression of the respective outputs of said pair of color detecting means;
   (c) subtracting mans for obtaining a difference between outputs of said pair of logarithmic compression means;
   (d) smoothing means for smoothing an output of said subtracting means;
   (e) peak detecting means for detecting a peak value of the output of said subtracting mans;
   (f) adding means for adding, at a predetermined ratio, an output of said smoothing means and an output of said peak detecting means; and
   (g) gain control means for controlling gains of color signals output from an image sensor in accordance with an output of said adding means.

2. An automatic white balance adjusting device according to claim 1, wherein said pair of color detecting means include a red color sensing means and a blue color sensing means.

3. An automatic white balance adjusting device according to claim 1, wherein said pair of color detecting means are included in said image sensor.

4. An automatic white balance adjusting device according to claim 1, further comprising inversion means for inverting the output of said adding means.

5. An automatic white balance adjusting device according to claim 1, wherein said gain control means controls a balance between a plurality of color signals output from said image sensor.

6. An image sensing apparatus having a color image sensor, comprising:
   (a) first means for forming first information which varies in response to color components of an object;
   (b) mixing means for mixing a peak value of said first information and a smoothed value of said first information at a predetermined ratio to output a mixed signal; and
   (c) white balance control means of controlling a white balance of outputs of said color image sensor in accordance with the mixed signal output from said mixing means.

7. An image sensing apparatus according to claim 6, wherein said first information includes a color-difference signal.

8. An image sensing apparatus according to claim 7, wherein said color-difference signal represents a difference between logarithmically compressed data of two different colors.

9. An image sensing apparatus according to claim 6, wherein said mixing means includes an adder.

10. An image sensing apparatus according to claim 6, wherein said mixing means includes a computer.

11. An image sensing apparatus according to claim 6, wherein said white balance control means includes amplifier means for effecting relative control of gains of color signals, included in the output of said image sensor.

12. An image sensing apparatus according to claim 7, wherein said color-difference signal is a color-difference signal between red and blue color signals.

13. An automatic white balance adjusting device, comprising:
   (a) color-difference detection means for detecting a color-difference between two color components of light coming from an object or thereabout to output a color-difference signal;
   (b) smoothing means for smoothing the color-difference signal;
   (c) peak detecting means for detecting a peak value of the color-difference signal; and
   (d) white balance control mans for controlling a white balance of outputs of a color-image sensor by simultaneously using an output of said smoothing means and an output of said peak detection means.

14. An automatic white balance adjusting device according to claim 13, wherein said white balance control means includes a mixing circuit for mixing the output of said smoothing means and the output of said peak detection means.

15. AN automatic white balance adjusting device according to claim 13, wherein said color-difference detecting means includes a pair of color sensors for sensing a pair of color components, a pair of logarithmic compression circuits for effecting logarithmic compression of the respective outputs of said pair of color sensors, and a subtracting circuit for obtaining a difference between outputs of said pair of logarithmic compression circuits.

16. A video camera, comprising:
   (a) image sensing means for transforming alight information of an object into an electric signal;
   (b) signal processing means for generating color signals by suing the electric signal;
   (c) color-difference detection means for detecting a color-difference between two color components of light coming from said object or thereabout to output a color-difference signal;
   (d) smoothing means for smoothing the color-difference signal;
   (e) peak detection means for detecting a peak value of the color-difference signal; and
   (f) control means for controlling gains of said color signals genera by said signal procuring means by simultaneously using both an output of said smoothing means and an output of said peak detection means.

* * * * *

UNITED STATES PATENT AND TRADEMARK OFFICE
CERTIFICATE OF CORRECTION

PATENT NO. : 5,132,783
DATED : July 21, 1992
INVENTOR(S) : Teruo Hieda

It is certified that error appears in the above-identified patent and that said Letters Patent is hereby corrected as shown below:

Col. 1, line 37. Change "in" to -- is --
Col. 4, lines 19, 26. Change "mans" to -- means --
Col. 4, line 56. Change "of" to -- for --
Col. 6, line 3. Change "AN" to -- An --
Col. 6, line 13. Change "alight" to -- a light --
Col. 6, line 26. Change "generra" to -- generated --

Signed and Sealed this

Twenty-first Day of September, 1993

Attest:

BRUCE LEHMAN

Attesting Officer

Commissioner of Patents and Trademarks